United States Patent [19]

Harner et al.

[11] 3,972,641

[45] Aug. 3, 1976

[54] COMPRESSOR BLEED SENSOR AND CONTROL FOR TURBINE TYPE POWER PLANTS

[75] Inventors: Kermit I. Harner, Windsor; William W. Hixson, Wethersfield; Michael A. Spadafora, Windsor, all of Conn.; Charles F. Stearns, Longmeadow, Mass.

[73] Assignee: United Technologies Corporation, Hartford, Conn.

[22] Filed: Apr. 4, 1975

[21] Appl. No.: 565,178

Related U.S. Application Data

[62] Division of Ser. No. 457,955, April 4, 1974, Pat. No. 3,924,960.

[52] U.S. Cl. .................................. 415/28; 60/39.29
[51] Int. Cl.² ...................... F01B 17/08; F02C 9/14
[58] Field of Search .................. 415/16, 17, 27, 28; 60/39.29

[56] References Cited

UNITED STATES PATENTS

| | | | |
|---|---|---|---|
| 2,969,805 | 1/1961 | Hunter | 415/27 |
| 3,006,145 | 10/1961 | Sobey | 60/39.29 |
| 3,327,932 | 6/1967 | Brodell | 415/28 |

Primary Examiner—Carlton R. Croyle
Assistant Examiner—L. J. Casaregola
Attorney, Agent, or Firm—Norman Friedland

[57] ABSTRACT

This invention relates to an improved surge control for a gas turbine type of power plant that bleeds the compressor to avoid surge and serves to isolate the effect that the engine area change has on the compressor discharge pressure rate signal to effectuate a viable signal indicative solely of acceleration and deceleration.

4 Claims, 2 Drawing Figures

COMPRESSOR BLEED SENSOR AND CONTROL FOR TURBINE TYPE POWER PLANTS

This is a divisional application of U.S. Ser. No. 457,955, now U.S. Pat. No. 3,924,960 filed Apr. 4, 1974.

BACKGROUND OF THE INVENTION

This invention relates to compressor bleeds for turbine type power plants and particularly to means for correcting for error in the sensed parameters occasioned by a change in engine geometry.

All axial flow compressors of gas turbine power plants have the propensity to surge or stall under certain operating conditions. While stall and surge are not completely understood, suffice it to say, that under certain conditions the flow separates from the airfoil section of the compressor blade causing a pressure pulsation setting up a vibratory condition which ultimately, not only leads to deterioration of the efficiency of the compressor but may cause damage to the engine itself.

It is well known in the art to provide means for bleeding the compressor section of an axial flow compressor of the turbine type power plant by either scheduling the bleed valve at a function of a predetermined operating parameter or merely holding the bleed valves opened during engine start-up. As for example, the steady state bleed control described herein is exemplary of a system for scheduling the bleed valve. It will be noted by referring to FIG. 2 that the scheduled bleed control opens the bleed valve below a predetermined corrected speed ($N/\sqrt{\theta}$) and closes the bleed valve between a given corrected speed value and maintains the valve closed beyond this value.

The problem solved by this invention is to assure that when the bleed valves open and the airflow diverted from the engine imposes an error on the signal sensed to actuate the surge valve reflecting the change in engine geometry. Hence, if the signal, such as compressor discharge pressure (CDP) is sensed to indicate acceleration or deceleration of the engine, the opening of the bleed valve would not be a true reflection of these conditions. The unwanted signal or error signal occasioned by changing engine geometry are isolated so that CDP is indicative solely of acceleration and deceleration.

SUMMARY OF THE INVENTION

It is an object of this invention to provide an improved compressor bleed control for a turbine type of power plant.

A still further object of this invention is to provide in an overriding bleed control as described means for sensing compressor discharge pressure as an overriding transient signal and means to cancel the functionally undesirable effect on the control of the decrease in actual compressor discharge pressure which occurs as the compressor bleeds are opened and closed, i.e., effectuate engine geometry changes.

Other features and advantages will be apparent from the specification and claims and from the accompanying drawings which illustrate an embodiment of the invention.

DESCRIPTION OF THE PREFERRED EMBODIMENT

Figures 1, 2:
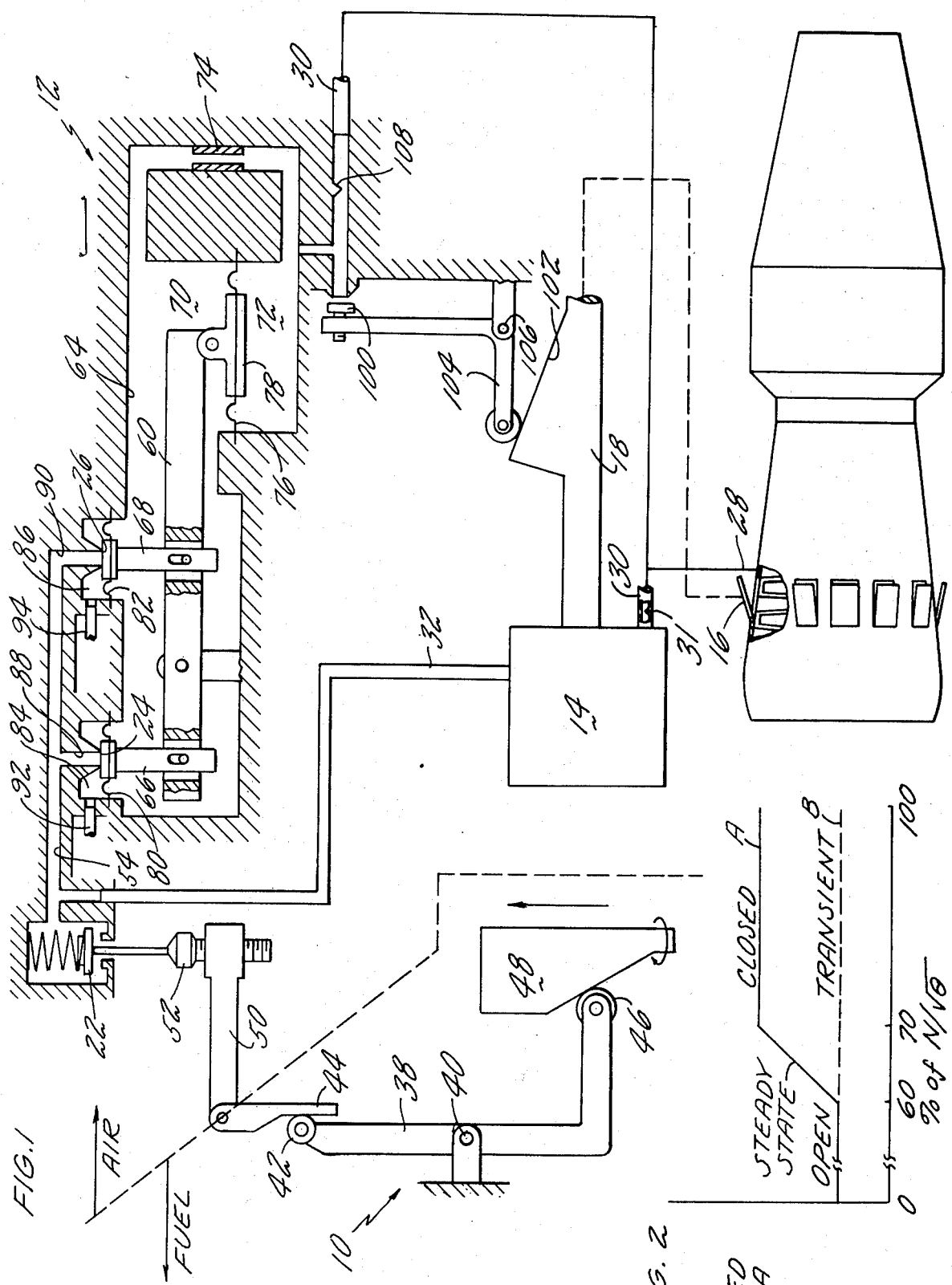
FIG. 1 is a view partly in section and partly in schematic illustrating the details of this invention and FIG. 2 is a graphical illustration demonstrating the functioning of the compressor bleed control described in FIG. 1.

The invention can best be described by referring to FIG. 1 which discloses the bleed control comprising the steady state control generally illustrated by reference numeral 10 and the transient or overriding control generally illustrated by reference numeral 12, both of which serve to control the pneumatic actuator 14, shown in blank which in turn positions the plurality of bleed valves 16. Although only one bleed valve 16 is shown connected to the actuator rod 18 of actuator 14, it is to be understood that all the bleed valves are ganged and are controlled concomitantly, although it is contemplated that more than one actuator may be employed.

The functioning of the bleed control may best be understood by referring to FIG. 2. It is the purpose of the control to maintain the bleed valves open when the engine is operating below a predetermined corrected speed, say where $N/\sqrt{\theta} = 60\%$ and closed above a predetermined corrected speed, say where $N/\sqrt{\theta} = 70\%$. Where $N$ = compressor speed in revolution per minute and $\theta$ = compressor inlet temperature divided by 519°Rankine. This is accomplished by the steady state control 10 and illustrated by the solid line A.

However, it is desirable to open the bleeds within the corrected speed range where the steady state control holds the bleeds closed during certain engine transient conditions, namely, certain acceleration and deceleration conditions of the engine and this is illustrated by the dash line B. In its preferred embodiment the invention is described where it measures the rate of change of compressor discharge pressure as an operating parameter. It is to be understood that this invention contemplates the use of other parameters that would be indicative of engine transient conditions such as rate of change of fuel flow delivered to the burner section of the engine.

Referring back to FIG. 1, the bleed control consists of three parallelly connected pneumatic flapper valves 22, 24 and 26, each of which are operatively connected to pneumatic actuator 14. Pneumatic actuator 14 may be any suitable commercially available actuator that moves proportionally to the pressure in line 32 for translating plunger or rod 18 rectilinearly. Compressor pressure is admitted to actuator 14 via lines 28 and 30 where it is conducted through a circuit and vented through flappers 22, 24 or 26. As will be obvious, a pressure drop represented schematically by orifice 31 must be present in order to obtain the control pressure. Thus opening of any of the flapper valves 22, 24 or 26 serves to vent the pressure in actuator 14 via line 32 to establish a control pressure in accordance with the schedule shown in FIG. 2, as will be more fully described hereinbelow.

Looking first at the steady state bleed control 10, which comprises bell crank 38 pivotally connected by suitable pivot 40 having one end carrying roller 42 bearing against link 44 and the other end carrying roller 46 bearing against three dimensional cam 48 which is contoured to provide the proper scheduled signal. Cam 48 is translated and rotated in a suitable manner as a function of compressor speed and turbine inlet pressure which provides the corrected speed signal ($N/\sqrt{\theta}$) and the schedule depicted as line A in FIG. 2. The clockwise rotation of bell crank lever 38 provides a counterclockwise rotation of arm 44 which is suitably connected through the fuel/air interface to lever 50 which carries adjustable rod 52 which, in turn, actuates spring loaded flapper 22 open. Movement of flapper 22 in an upward direction unseats the valve and communicates line 32 to atmosphere via the connecting line 54. Actuator 14 is so designed as to provide a position at 18 for various areas of flapper 22 thus providing the transition from open to close.

Hence, below the 60% corrected speed level the rod 52 will hold flapper 22 in the open position venting line 32 and holding bleed valves 16 open as shown in FIG. 1. As engine speed increases the scheduled steady state control will cause flapper 22 to seat and block off the venting causing actuator 14 to position rod 18 and close bleed valve 16.

Valves 24 and 26 of the transient control 12 are positioned by a single lever 60 pivotally attached to suitable pivot 62 supported in cavity 64. Links 66 and 68 are suitably connected to lever 60 on opposite ends of pivot 62 and serves to position flappers 24 and 26 respectively. Suitable pins in oversized slots formed in links 66 and 68 permit movement of either link 66 or link 68 without interference with the other. Cavity 64 is divided into a pair of subchambers 70 and 72 and compressor discharge ($P_3$) pressure is admitted into both chambers via lines 28 and 30, but is conducted through the laminar flow restrictor 74 before entering into subchambers 70. Thus diaphragm 76 forming the movable wall between subchambers 70 and 72 serves to measure the rate of change of $P_3$ pressure. Connecting member 78 suitably attached to and movable with diaphragm 76 is suitably connected to lever 60 to move it in either a clockwise or counterclockwise direction.

From the foregoing it is apparent that when $P_3$ pressure increases or decreases, a pressure differential occurs across diaphragm 76, moving lever 60 which opens flappers 24 or 26 depending on whether $P_3$ pressure is increasing as occurs during an acceleration or decreasing as occurs during deceleration. Diaphragms 80 and 82 attached to flappers 24 and 26 serve to divide cavity 64 into additional subchambers 84 and 86 respectively so that when each flapper 24 or 26 moves relative to the end of lines 88 and 90, they will be in communication with ambient atmosphere via passages 92 and 94 respectively.

Since each flapper 24 and 26 utilize individual diaphragms (80 and 82) they also serve to provide altitude compensation (since they are in communication with ambient) and a positive system rate.

In accordance with this invention another pneumatic flapper valve 100 operating to vent line 30 modifies the $P_3$ signal as a function of the position of rod 18 by virtue of the cam 102 and bell crank 104 pivoted about suitable pivot 106 to cancel the decrease in $P_3$ pressure which occurs as the compressor bleeds are opened. Thus as rod 18 moves it carries cam 102 which is profiled to position bell crank 104 and hence flapper 100 relative to the end of line 30. The flow through restrictor 108 will vary as a function of the curtain area defined by flapper 100 and hence this valve related to the profile of cam 102 and the position of rod 18 defines a feedback signal that will cancel out the change in $P_3$ that occurs as a result of the transient control 12 opening the bleed valves. It is obvious that cam 102 can be contoured to provide 100% cancellation or any percentage that proves most advantageous.

OPERATION OF THE SYSTEM

Acceleration

During an acceleration from a point on the engine steady state line (bleeds closed, Line A, FIG. 2), an increase in $P_3$ pressure occurs. The change in $P_3$ pressure causes the $P_3$ pressure to increase. The laminar restrictor, which connects subchamber 72 with subchamber 70 causes the increase in pressure in chamber 70 to lag the pressure in 72 and create a pressure differential across diaphragm 76. Diaphragm 76 owing to this pressure differential moves lever 60 and opens the acceleration flapper 24 which vents the pressure in line 32 to ambient and causes the bleed valve actuator to move towards the open position.

An important aspect of this invention is to assure that the $P_3$ pressure signal is a true indication of acceleration and deceleration of the engine. To cancel out the effect of the area change of the engine attendant the opening of bleed 16, and with a consequential change in $P_3$, bell crank 102 positioned by the actuator rod 18 closes flapper valve 100 to decrease the pressure drop across 108 and hold pressure downstream of 108 at substantially a constant value. Otherwise when closing the bleeds, the pressure drop will be increased with a similar result during deceleration. In both instances, the $P_3$ signal will be isolated from the influence incidental to opening and closing the bleeds. This assures that the $P_3$ rate signal is an accurate indication of engine acceleration and deceleration.

As the engine speed returns to a steady state operating condition the rate of change of $P_3$ pressure approaches zero and the acceleration flapper 24 closes, which signals bleed actuator 14 to close bleed 16.

Deceleration

During an engine deceleration from a bleed's closed point on the steady state line, FIG. 1, the device opens engine bleeds 16 by sensing the decreasing rate of change of $P_3$ and opening the decel flapper valve 26 which signals the bleed actuator to open the bleeds. As the engine approaches the steady state operating condition the rate of change of $P_3$ approaches zero and the bleeds close.

Steady State

Below a predetermined engine speed the $N/\sqrt{\theta}$ flapper valve 22 is held open, thus venting the bleed actuator $P_m$ pressure to ambient and causing the bleeds to remain open through the required speed range.

What has been shown by this invention is means that cancel the effect on the compressor discharge pressure signal occasioned by the engine bleeds opening and closing.

It should be understood that the invention is not limited to the particular embodiments shown and described herein, but that various changes and modifications may be made without departing from the spirit or scope of this novel concept as defined by the following claims.

We claim:
1. In a compressor bleed system for a gas turbine power plant having a compressor where the bleed system alters the geometry of said power plant and affects the airflow in the power plant, means responsive to the pressure of the airflow of said compressor for producing a signal indicative of a rate change of said pressure, and compensating means responsive to said geometry change of said power plant to modify said pressure responsive means to compensate for the affect of said geometry changes affecting the pressure of said airflow so that said signal is indicative of acceleration of said power plant.

2. In a compressor bleed system for a gas turbine power plant having a compressor where the bleed system alters the geometry of said power plant and affects the airflow in said gas turbine power plant, means responsive to the pressure of said compressor for producing a signal indicative of a rate change of said pressure, and compensating means responsive to said geometry change of said power plant to modify said pressure responsive means to compensate for the effect said geometry changes affecting the pressure of said airflow so that said signal is indicative of acceleration and deceleration of said power plant.

3. In a bleed system for a gas turbine type of power plant, where the bleed system changes the geometry of said power plant, means for producing a signal indicative of acceleration and deceleration of said power plant including a fluid means for producing a pressure signal indicative of engine operation, means for modifying said pressure signal to produce a rate of change value of said pressure signal and means responsive to said change in geometry for further modifying said pressure signal so that said rate of change value is not adversely affected by the airflow being bled by said change of geometry.

4. In a bleed system as claimed in claim 3 including a rate of change measuring means, a fluid connection interconnecting said power plant and said rate of change measuring means including a restriction disposed therein intermediate the ends thereof, a control valve adjusting the area of an opening in said fluid connection and feedback means indicative of changes of said geometry operatively connected to said control valve for modifying the pressure drop across said restriction.

* * * * *